United States Patent [19]

Thioux

[11] Patent Number: 4,784,242
[45] Date of Patent: Nov. 15, 1988

[54] PAD FOR A DISC BRAKE AND DISC BRAKE EQUIPPED WITH SUCH PADS

[75] Inventor: Alain Thioux, Chennevieres, France

[73] Assignee: Bendix France, Drancy, France

[21] Appl. No.: 111,738

[22] Filed: Oct. 21, 1987

[30] Foreign Application Priority Data

Oct. 31, 1986 [FR] France .................. 86 15194

[51] Int. Cl.[4] ............... F16D 55/224; F16D 65/06
[52] U.S. Cl. ............... 188/73.34; 188/73.38; 188/73.45; 188/250 E; 188/73.39; 188/205 A
[58] Field of Search ........... 188/73.38, 73.37, 73.36, 188/73.35, 73.34, 73.32, 73.31, 73.39, 73.44, 73.45, 73.1, 250 E, 205, 206, 71.1; 192/30 V, 70.13

[56] References Cited

U.S. PATENT DOCUMENTS

| 4,049,087 | 9/1977 | Heinz et al. ............ 188/73.38 |
| 4,061,209 | 12/1977 | Gee et al. ............ 188/73.39 X |
| 4,068,743 | 1/1978 | Karasudani et al. ............ 188/71.1 |
| 4,082,167 | 4/1978 | Einchcombe et al. ............ 188/73.34 |
| 4,109,766 | 8/1978 | Inoue et al. ............ 188/73.34 |
| 4,219,105 | 8/1980 | Delaunay ............ 188/73.38 |
| 4,394,891 | 7/1983 | Oshima ............ 188/73.38 |
| 4,428,463 | 1/1984 | Burgdorf et al. ............ 188/73.38 |
| 4,441,588 | 4/1984 | Saito ............ 188/73.38 |
| 4,467,897 | 8/1984 | Kubo et al. ............ 188/73.38 |
| 4,467,898 | 8/1984 | Courbot et al. ............ 188/73.34 X |
| 4,527,667 | 7/1985 | Courbot ............ 188/73.34 |
| 4,538,708 | 9/1985 | Seki ............ 188/73.38 |
| 4,588,051 | 5/1986 | Mery ............ 188/73.32 |
| 4,699,255 | 10/1987 | Claverie ............ 188/73.38 |

FOREIGN PATENT DOCUMENTS

| 0032462 | 7/1981 | European Pat. Off. . |
| 2619984 | 11/1976 | Fed. Rep. of Germany . |
| 2296129 | 7/1976 | France . |
| 2316478 | 1/1977 | France . |
| 2415234 | 8/1979 | France . |
| 2420692 | 10/1979 | France . |
| 2553165 | 4/1985 | France . |
| 0001782 | 4/1985 | PCT Int'l Appl. ............ 188/73.38 |
| 2147673 | 5/1985 | United Kingdom ............ 188/73.36 |

Primary Examiner—Douglas C. Butler
Attorney, Agent, or Firm—Larry J. Palguta; Ken C. Decker

[57] ABSTRACT

The brake pad (10) comprises a lining (8), a lining support (11) and a spring (15) fastened at (17) to the support (11) near one edge of the support. The two free ends of this spring are shaped so that each forms a mechanism for attachment (23, 24, 25; 23', 24', 25') of the pads. These two free ends grip two adjacent bearing surfaces formed on the caliper of the disc brake equipped with this pad. The invention is used for the preassembly of pads in a disc brake incorporated in the stub axle of the vehicle wheel.

7 Claims, 2 Drawing Sheets

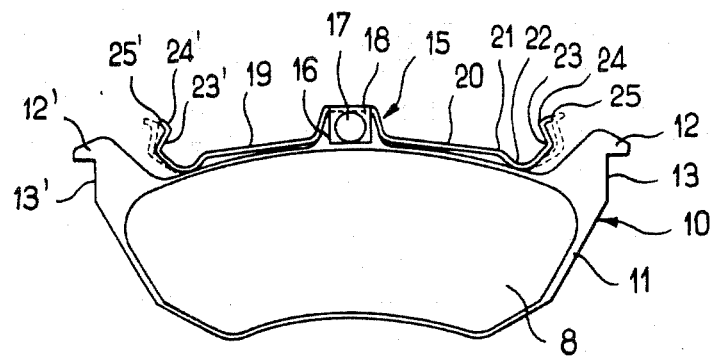
FIG_1
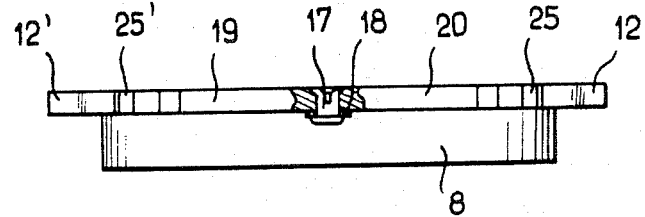
FIG_2

PAD FOR A DISC BRAKE AND DISC BRAKE EQUIPPED WITH SUCH PADS

The present invention relates to a pad for a disc brake and more particularly to such a pad equipped with an anti-vibration spring member. The present invention also relates to a disc brake equipped with such pads.

A disc brake of a conventional type comprises a caliper straddling the disc and brake pads arranged in this caliper on either side of the disc. The pads are movable in an axis perpendicular to the disc, so as to grip the latter during braking or move away from it to release the disc outside the braking periods. Guides are provided to allow the pads to move. Because of the play necessary for the pads to slide in these guides, the occurrence of vibrations causing wear and generating noise would be noted if these vibrations were not prevented by a suitable means. Conventionally, this means consists of an elastic member, such as a spring, which loads the pads against one face of the guides, in order to prevent these vibrations from occurring. Many configurations of springs intended for performing this function are known. In particular, French Pat. No. 2,296,129 describes such a leaf spring, comprising a central part fastened by gripping to the support of the pad and two arms, the free ends of which are pressed by the caliper of the disc brake against lugs projecting from the support of the pad, in order to prevent vibrations of this pad or at least reduce the extent of these.

Conventionally, the brake caliper is slideably mounted on a yoke fixed to the hub of the wheel equipped with the brake. To speed up assembly and removal of the brake, it is desirable for it to be possible to preassemble the pads on the caliper, so that, when the brake is assembled, these pads assume the operating position directly, simply as a result of the fitting of the caliper previously lined with pads. Likewise, during removal, it is desirable for it to be possible to detach the pads from the brake quickly. The pads-equipped with the spring described in French Pat. No. 2,296,129 are unsuitable for such pre-assembly on the caliper.

To meet these requirements, U.S. Pat. No. 4,394,891 describes a disc brake, the caliper of which is equipped with a wire spring which loads the brake pads in order to prevent these pads from vibrating during the braking period. Moreover, this wire spring can interact with teeth formed on the supports of the pads, so that these pads can be transported by gripping during assembly or removal. A single unit consisting of the caliper, the spring and the pads is thus moved as a whole simultaneously.

However, it can be seen that this wire spring is costly to produce, since it has many bends directed in different planes. Furthermore, since the wire is not fixed to the pads, it is not rep-laced automatically together with these when extreme wear of the linings of the pads is detected. The fact that the spring is not renewed when the pads are replaced is considered unsatisfactory in terms of the operating safety of this spring which can break as result of excessive fatigue. Finally, the removal of the brake pads, described in the U.S. patent mentioned above, is not very easy, since two columns supporting the caliper have to be extracted beforehand, in order to allow the unit comprising the caliper and pads to be released from the lateral guides of the pads.

It is therefore an object of the invention to provide a pad for a disc brake, which is designed to make it easier to assemble and remove the brake and the pads and which does not have the disadvantages mentioned above.

An object of the invention is also to provide a disc brake designed to receive such pads.

According to the present invention, there is provided a pad for a disc brake with a sliding caliper, comprising a friction lining fastened to a support and an elastic member mounted on this support in order to compensate the play between the pad and bearing surfaces of the pad which are provided in the disc brake equipped with this pad, characterized in that this elastic member has at least one part shaped as a means of attaching the pad to the caliper of the disc brake receiving the pad, for the purpose of the pre-assembly of the pad on the caliper and the subsequent assembly of the caliper/pad unit.

According to the present invention, there is also provided a disc brake with a sliding caliper, equipped with such pads, comprising a supporting member fixed to the associated stub axle of a vehicle wheel, the caliper being mounted on this member by means of at least one column allowing the axial sliding of the caliper on the member, characterized in that the caliper has at least one bearing surface shaped so as to interact with a means of attachment of a pad, in order to keep the latter suspended on the caliper.

The invention will now be described by way of example with reference to the accompanying drawings in which, FIG. 1 is a front view of the pad equipped with the spring according to the invention;

FIG. 2 is an elevation view of the pad of FIG. 1;

Figure 3:
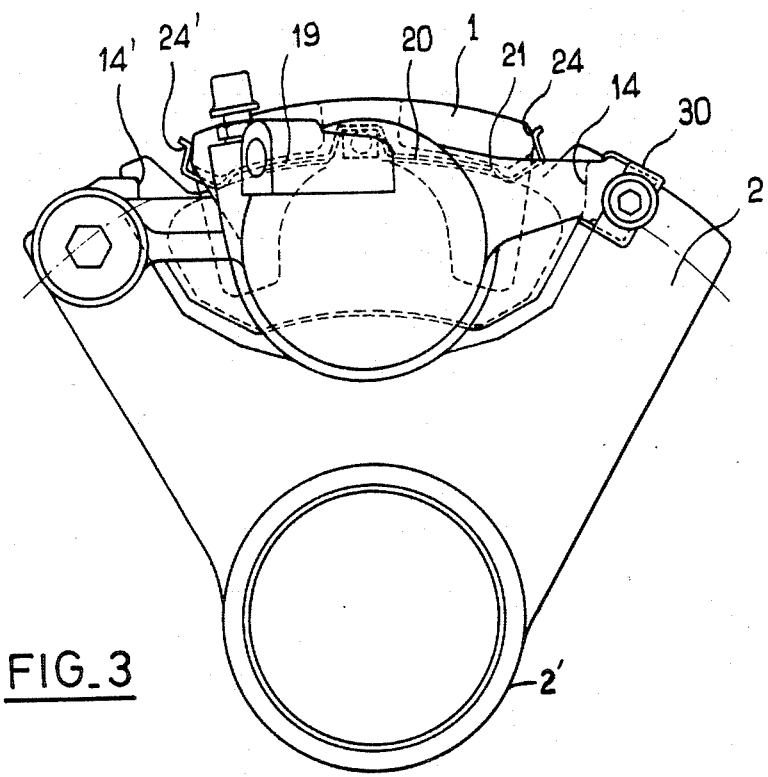
FIG. 3 is a front view of the disc brake according to the invention equipped with pads conforming to that of FIGS. 1 and 2.
Figure 4:
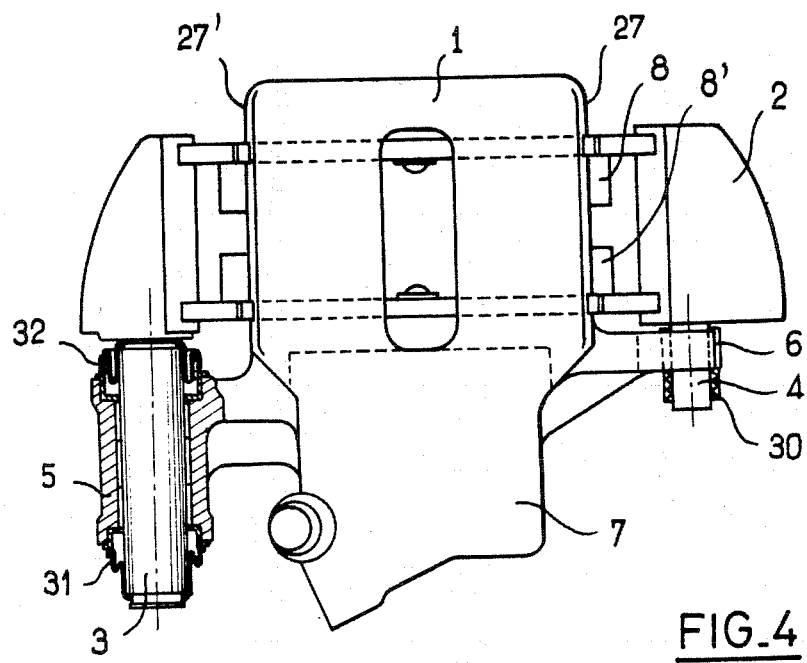
FIG. 4 is an elevation view of the disc brake of FIG. 3.

Reference will be made to FIGS. 3 and 4 of the drawing, which illustrate the disc brake according to the invention. This conventionally comprises a caliper 1 slideably mounted on a supporting piece 2 by means of two columns 3 and 4 which pass through perforations in the arms 5 and 6 of the caliper respectively. The caliper also has a brake motor 7 which, for example, is actuated hydraulically, in order to press friction linings 8, 8' against two opposite faces of a disc (not shown) fixed to the hub of a wheel of a vehicle for the purpose of braking the latter. As is well known, the caliper 1 can slide on the columns 3, 4, so that the brake motor can act by reaction on the lining 8, in such a way that the latter comes up against a face of the disc when the other lining 8' is pressed against this disc by means of the brake motor.

According to one feature of the brake of the present invention, the supporting piece 2 is formed integrally with the stub axle 2' of the wheel, and the caliper 1 can thus be mounted directly on this stub axle as a result of screwing the threaded ends of the columns 3, 4 into corresponding threaded bores machined in the supporting piece. It will be appreciated that the assembly of the brake according to the invention on a vehicle can be speeded up in this way, since there is no need to fit the conventional yoke, on which the caliper is normally mounted by means of columns.

According to the invention, this assembly is speeded up even further by providing a brake pad designed to be installed on the stub axle at the same time as the caliper by attachment means incorporated in an elastic member mounted on this pad for the purpose of compensating play between the latter and associated bearing surfaces f the brake, since this play would otherwise generate noise and cause wear as result of the vibrations of the pad which it allows during the braking period.

Reference is now made to FIGS. 1 and 2 which illustrate such a pad 10 comprising a friction lining 8 fastened to a support 11 cut out, for example, from a metal sheet of small thickness, as is well known in the motor-vehicle industry.

The support 11 is symmetrical in a plan view and comprises two lugs 12, 12' and two right-angled cut-outs 13, 13' shaped so as to interact with matching bearing surfaces 14, 14' provided on the supporting piece 2 (see FIG. 3), to define the radial operating position of the pad in relation to the disc.

An elastic member, such as a leaf spring 15, is mounted on a central lug 16 of the pad by a fastening means, such as a rivet 17, passing through a hole made in this lug and a coaxial hole made in a tongue 18 projecting from the spring 15 parallel to the plane of the support 11. Advantageously, for the reasons mentioned in the introduction, the elastic member cannot be separated from the pad.

The spring 15 comprises two symmetrical arms 19, 20 (FIG. 2) covering the width of the support 11. Each arm has several folds with parallel axes 21, 22, 23, 24, for example, on the arm 20. Because they are parallel, these folds are easy and inexpensive to make from a plane spring leaf. Between the rivet 17 and the fold 21, the arm 20 has a straight profile virtually parallel to the adjacent edge of the lining support 11.

At the fold 21, the arm moves away from this edge slightly, to define a bearing surface, on which the caliper of the brake bears in the operating position (FIG. 3) in order to load the pad against the horizontal parts of the bearing surfaces 14, 14' and thus perform the conventional function of compensating play for the purpose of preventing vibration, noise and wear.

According to an essential feature of the pad spring according to the present invention, the symmetrical arms 19 and 20 have free ends folded in a V-shaped profile (23, 24; 23', 24') ending in a short lip 25, 25' which moves away from the axis of the rivet 17 of the spring. The caliper 1 (FIG. 3) itself has two bearing surfaces, such as edges 27, 27' (FIG. 4) parallel to the axis of the rivet, these edges having V-shaped cross-sections generally matching the V-shaped profiles (23, 24; 23', 24') of the free ends of the spring.

At rest, the folds 24, 24' of the spring are set apart from one another at a distance less than that separating the edges 27, 27' of the caliper. Thus, according to the invention, a pad can be mounted on the caliper simply by pressing this pad towards the lower face of the caliper (as seen in FIG. 3), in such a way that the folds 24, 24' move away from one another under the effect of this pressure (positions represented by broken lines in FIG. 3) until they go beyond the bottoms of the V-shaped profiles of the edges 27, 27' after which the pad is retained on the caliper because the substantially matching V-shaped profiles of the edges 27, 27' of the caliper are gripped by the corresponding ends of the spring. Two pads can be mounted on a caliper in this way.

The caliper/pad unit so formed can then be handled as a single article, in order to be mounted on the stub axle 2' and supporting piece 2 by means of the columns 3, 4. For this purpose, the unit is completed by pre-assembling the columns in the arms 5, 6 of the caliper (FIG. 4), taking care to prevent their threaded ends from projecting from these arms. Various friction-type retention means can be used for this, such as, for example, a plastic sleeve 30 for the column 4 or the conventional flexible protective sheaths 31, 32 for the column 3.

When the unit is positioned on the stub axle and supporting piece, the columns 3, 4 are screwed to the latter in order to secure the caliper and the pads relative to the brake disc previously installed, together with the wheel hub, on the stub axle.

When the brake is removed, for example in order to replace pads with worn linings by new pads, it is sufficient to remove the column 4 and then swing the caliper about the column 3 to release the pads to be replaced. This operation comes easier if the end 24' of the spring arm 19 (FIG. 3) is moved slightly away from the edge 27' of the caliper. Because of the radii of curvature used, the other edge 27 of the caliper comes away from the adjacent end of the spring without difficulty. Finally, the pads are removed by releasing them from their bearing surfaces 14, 14' in a radial direction.

Thus, the invention provides a brake pad equipped with a spring of low production cost, which will also be discarded at the same time as a worn pad and which makes it possible to assemble and remove the caliper/pad unit quickly. In this respect, it will be seen that the replacement of pads only requires the extraction of a single column, not both columns, as with the pads and disc brake of the U.S. patent mentioned above.

Of course, the invention is not limited to the embodiment described and illustrated merely by way of example. In particular, the invention embraces any brake pad equipped with means designed to ensure that this pad is attached elastically to a disc-brake caliper, and these means can have a different form from that of a leaf spring, for example a wire spring. Likewise, the "antivibration" and "attachment" functions of the elastic member could be separated.

I claim:

1. A disc brake assembly having a caliper mounted slideably on columns attached to a supporting piece provided with bearing surfaces, and the brake assembly equipped with brake pads, each pad comprising a friction lining fastened to a pad support and an elastic member mounted on the pad support in order to compensate for play between the pad and the bearing surfaces, the elastic member comprising a leaf spring having two arms symmetrical relative to an assembly axis for the leaf spring on the pad support, each pad support having a radial lug with an opening therein, the elastic member having a tongue projecting therefrom and disposed adjacent the radial lug, fastening means disposed in the opening of the lug and a coaxial opening in the tongue in order to fasten inseparably the elastic member to the lug, each arm providing means for attaching the respective pad to the caliper of the disc brake assembly so that the pads, caliper, and supporting piece may be preassembled as a unit, the attaching means at free ends of the arms and having a shape substantially matching the shape of an adjacent caliper bearing surface, each free end folded toward the associated lug and in the shape of a V, the free ends ending in lips disposed apart from one another a distance less than a distance separating the caliper bearing surfaces so that the free ends may be snapped-fitted over the associated caliper bearing surfaces in order to attach the associated pad to the caliper, and at least one of the free ends exposed radially so that the one free end can be biased away from the associated caliper bearing surface and the caliper pivoted about one of the columns without the associated pad attached thereto whereby the associated pad remains between the bearing surfaces of the supporting piece for quick removal therefrom.

2. The disc brake assembly in accordance with claim 1, wherein the supporting piece includes a stub axle.

3. The disc brake assembly in accordance with claim 2, wherein the bearing surfaces of the supporting piece are each V-shaped and supportingly engage correspondingly shaped pad support lugs.

4. The disc brake assembly in accordance with claim 3, wherein the elastic member is a leaf spring having a width equal to the thickness of the pad support.

5. A method for assembling the disc brake assembly according to claim 1, comprising the following steps:
pressing the lips of the free ends into engagement with the caliper bearing surfaces until the free ends snap-fit over the caliper bearing surfaces and retain the brake pads to the caliper,
fitting the columns onto the arms of the caliper, and attaching the columns to the supporting piece.

6. The method for assembling the disc brake assembly according to claim 5, wherein the supporting piece includes a stub axle.

7. The method for assembling the disc brake assembly according to claim 6, further comprising the step of mounting a brake disc on the stub axle, the caliper and pads mounted on the supporting piece and positioned relative to the brake disc.

* * * * *